United States Patent
Pierre Cote et al.

(10) Patent No.: US 7,613,801 B2
(45) Date of Patent: *Nov. 3, 2009

(54) SYSTEM AND METHOD FOR MONITORING SERVER PERFORMANCE USING A SERVER

(75) Inventors: Joseph Paul-Emile Pierre Cote, Bellevue, WA (US); Stephen David Thomas, Redmond, WA (US); Steve Masters, Kent, WA (US)

(73) Assignee: Microsoft Corporation, Redmond, WA (US)

(*) Notice: Subject to any disclaimer, the term of this patent is extended or adjusted under 35 U.S.C. 154(b) by 1134 days.

This patent is subject to a terminal disclaimer.

(21) Appl. No.: 09/855,445

(22) Filed: May 15, 2001

(65) Prior Publication Data

US 2001/0042122 A1 Nov. 15, 2001

Related U.S. Application Data

(63) Continuation of application No. 09/353,304, filed on Jul. 13, 1999, now abandoned, which is a continuation-in-part of application No. 08/682,832, filed on Jul. 12, 1996, now Pat. No. 5,938,729.

(51) Int. Cl.
G06F 15/173 (2006.01)
(52) U.S. Cl. .................... 709/224; 709/219; 709/223
(58) Field of Classification Search ................ 709/202, 709/223–224, 230, 233
See application file for complete search history.

(56) References Cited

U.S. PATENT DOCUMENTS

| | | | |
|---|---|---|---|
| 5,230,051 A * | 7/1993 | Quan | 719/312 |
| 5,247,676 A | 9/1993 | Ozur et al. | 395/650 |
| 5,283,856 A | 2/1994 | Gross et al. | 395/51 |
| 5,414,858 A | 5/1995 | Hoffman et al. | 395/725 |
| 5,491,791 A | 2/1996 | Glowny et al. | 395/183.13 |
| 5,491,820 A * | 2/1996 | Belove et al. | 707/3 |
| 5,506,955 A | 4/1996 | Chen et al. | 395/183.02 |
| 5,619,656 A | 4/1997 | Graf | 395/200.11 |
| 5,631,949 A | 5/1997 | Milton et al. | 379/67 |
| 5,659,787 A * | 8/1997 | Schieltz | 709/226 |
| 5,684,945 A | 11/1997 | Chen et al. | 395/182.18 |
| 5,696,486 A | 12/1997 | Poliquin et al. | 340/506 |
| 5,701,451 A * | 12/1997 | Rogers et al. | 707/1 |
| 5,748,896 A * | 5/1998 | Daly et al. | 709/223 |

(Continued)

OTHER PUBLICATIONS

Kramer, Matt, "Baranofs MailCheck 2.6 Delivers Improved Tools," PC Week, Sep. 11, 1995, Ziff David Publishing Company, 1995.

(Continued)

*Primary Examiner*—Aaron Strange
(74) *Attorney, Agent, or Firm*—Workman Nydegger

(57) ABSTRACT

A method and system is described for monitoring the performance of a monitored server system using a polling server system. A single query is generated by the polling server system and transmitted to the monitored server system. The single query represents a request for a compilation of information about the performance of numerous services offered by a monitored server system. Upon receiving the single query, the monitored server system generates the compilation of information regarding the services it offers, and then transmits the compilation of information to the polling server system.

35 Claims, 9 Drawing Sheets

U.S. PATENT DOCUMENTS

| | | | | |
|---|---|---|---|---|
| 5,802,303 | A | | 9/1998 | Yamaguchi ............ 395/200.54 |
| 5,809,161 | A | * | 9/1998 | Auty et al. .................. 382/104 |
| 6,006,017 | A | * | 12/1999 | Joshi et al. .................. 709/224 |
| 6,269,398 | B1 | * | 7/2001 | Leong et al. ................ 709/224 |

OTHER PUBLICATIONS

Frenkel, Gary, "*cc: Mail View Keeps an Eye on Your Messaging System*," Network Computing, Jun. 1, 1995, CMP Publications, Inc., 1995.

* cited by examiner

SYSTEM AND METHOD FOR MONITORING SERVER PERFORMANCE USING A SERVER

RELATED APPLICATION

This application is a continuation of U.S. application Ser. No. 09/353,304 entitled "System and Method for Monitoring Server Performance Using a Server" filed Jul. 13, 1999, now abandoned which is a continuation-in-part of U.S. application Ser. No. 08/682,832 entitled "System and Method for Monitoring Server Performance at a Client Computer" (as amended), filed Jul. 12, 1996, now U.S. Pat. No. 5,938,729, which is incorporated herein by reference in its entirety.

BACKGROUND OF THE INVENTION

1. The Field of the Invention

The present invention relates to electronic communications. Specifically, the present invention relates to a system and method for monitoring server performance using a server.

2. The Prior State of the Art

Computer networks are playing an increasingly important role in the information age. One important component of a computer network is a server system. A "server system" is a hardware and/or software component that provides services to another component of the computer network typically termed a "client system." The client system may be, for example, a personal computer or workstation associated with a user.

A typical server system may provide numerous services to a client system. These services might be available, for example, in the form of software modules. The server software is supported by operating system software that provides the server software with access to resources such as the server's computer hardware resources and the server's user interface resources.

It is desirable to monitor the performance of server systems on a network to ensure the network is operating properly. Typically, the operating status of an individual service of a server system may be determined by sending a computer-generated query to the server system. In response to the query, the server system sends a reply that includes the operating status of the service. The reply indicates, among other things, whether the service is running. The queries and replies typically include at least one query and one reply per service. Thus, to determine the status of multiple services at a single server, the querying computer sends multiple queries and receives multiple replies.

The issuance of each query takes time. Thus, it is desirable to reduce the number of queries generated to monitor the performance of the services provided by a server system.

SUMMARY OF THE INVENTION

The present invention relates to a method and system for monitoring the performance of a monitored server system using a polling server system. However, the number of queries needed to be issued for each monitored server system is significantly reduced, thereby significantly reducing polling time.

Instead of a query being generated and transmitted for each service offered by a monitored server system, a single query is generated for the entire monitored server system. Specifically, the single query is generated by a polling server system. The single query represents a request for a compilation of information about the performance of numerous services offered by the monitored server system. After generating the single query, the polling server system then transmits this single query to the monitored server system. Upon receiving the single query, the monitored server system generates the compilation of information regarding the services it offers, and then transmits the compilation of information to the polling server system. Thus, with this single query, the polling server system obtains an entire compilation of information regarding the performance of the monitored server system. The polling server can likewise query other monitored server systems to obtain further compilations.

The compilation of information may include performance deficiencies detected in the monitored server system. When a deficiency is detected in the most recent polling of the monitored server system, the monitored server system is listed in a critical server system list. At this point, the polling server system may poll the critical server system more frequently since the monitoring of the server system performance is typically more important once an operating deficiency is detected.

Once the compilation of information is obtained by the polling server system, any or all of the compilation may be then provided to a client system so that, for example, a system administrator can review the information to diagnose and remedy any deficiency in the monitored server system. The compilation may be provided to the client system either automatically, or upon the happening of a predetermined event such as receiving a request for the compilation from the client system.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to systems and methods for monitoring server system performance using a server system. Specifically, a polling server system generates a single request to obtain a compilation of information from a monitored server system. Since fewer queries are needed to monitor each server system, polling time is reduced and network efficiency improved.

Embodiments within the scope of the present invention include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
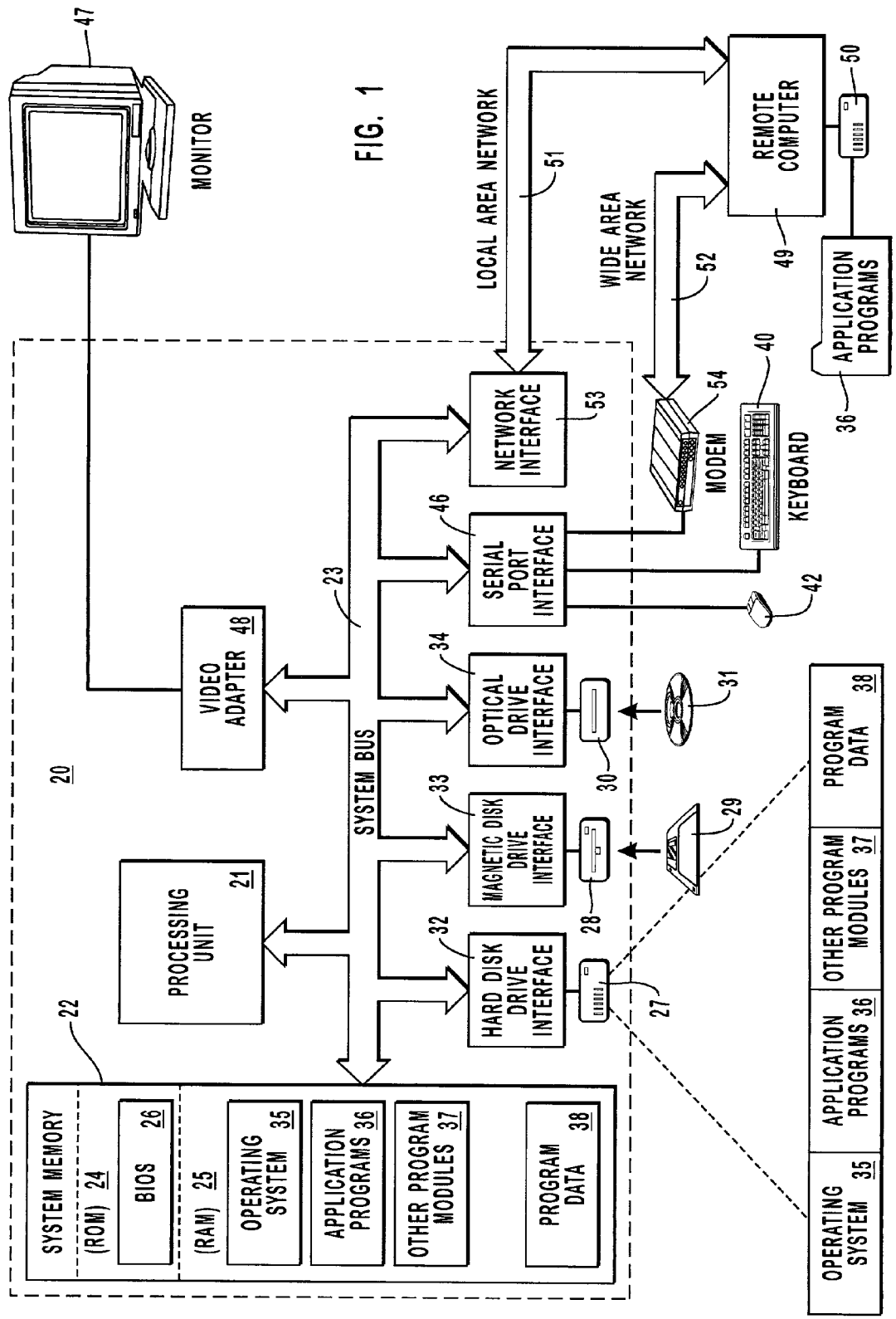
FIG. 1 illustrates an exemplary system that provides a suitable operating environment for the present invention.

FIG. 1 and the following discussion are intended to provide a brief, general description of a suitable network environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps and acts of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

With reference to FIG. 1, an exemplary system for implementing the invention includes a general purpose computing device in the form of a computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk, a removable magnetic disk 29 and a removable optical disk 31, other types of computer readable media for storing data can be used, including magnetic cassettes, flash memory cards, digital video disks, Bernoulli cartridges, RAMs, ROMs, and the like.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
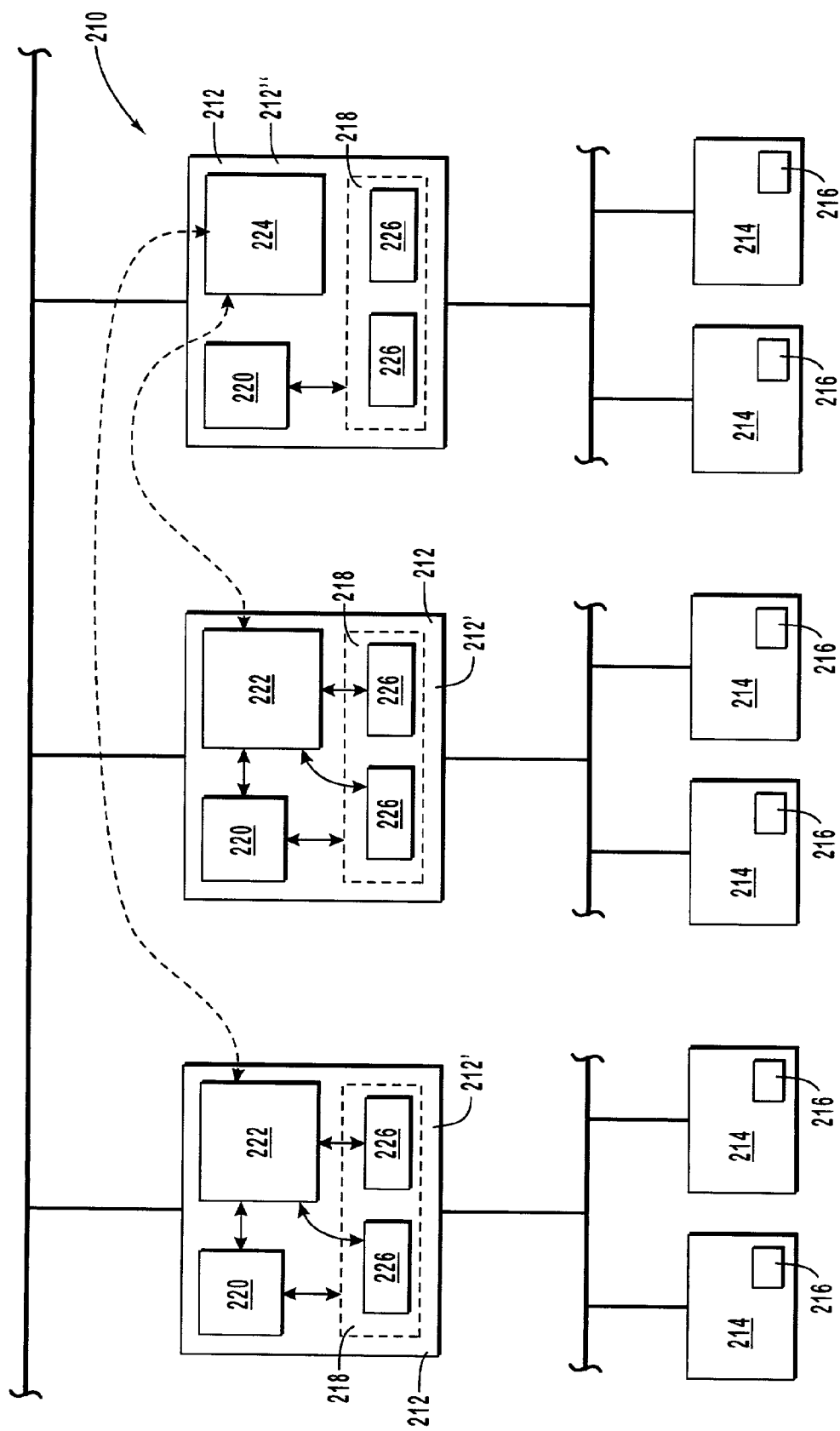
FIG. 2 is a schematic diagram illustrating a suitable network environment in which the invention can be implemented.

FIG. 2 illustrates a client-server system 210 that includes server systems 212 that are networked together and with client systems 214. Client software 216 resides on the client systems 214 and server software 218, including various services 226, resides on the server systems 212. Each server system 212 also may include a time indicator 220 that is used by the server software 218 for adding a timestamp to outgoing messages.

In one embodiment, client-server system 210 is a messaging system, server systems 212 are messaging servers, client systems 214 are user computers such as the computer 20 of FIG. 1, client software 216 is client messaging software, and server software 218 is server messaging software. Although this embodiment of a messaging system is described in further detailed below, it will be understood that the principles of the present invention may extend to many other types of network systems as well.

In the case of a messaging system, the client messaging software 216 and the server messaging software 218 allow the user associated with each client system 214 to create outgoing messages and otherwise manipulate messages. In addition, in order to read messages stored at the user's mailbox at the corresponding server system 212, the user's client system 214 links with the corresponding server system 212 by, for example, initiating a messaging session.

To initiate a messaging session, the user runs the client messaging software 216 and causes the client messaging software 216 to log into the server system 212 using a login procedure. Typically, a user password is passed to the server messaging software 218, which allows a working connection to be established only if the server system 212 recognizes the password. After the login procedure is completed, the user is able to proceed with the messaging session. The messaging session may be closed and the working connection may be broken by the user de-activating the client messaging software 216. Deficiencies in the client-server system 210 are detected by a monitoring system that includes polling software 224 that resides on one of the server systems 212 that polls (namely, polling server system 212") and attendant software 222 that resides on the server systems 212 that are monitored (namely, monitored server systems 212'). Each instance of attendant software 222 compiles information about the server system 212 on which the attendant software 222 runs and, when queried by the polling software 224, provides the compilation to the polling software 224.

The compilation includes information about the services 226 of the server messaging software 218 including, for example, a directory service, a message store service, and a message transfer agent service. The directory service maintains records of locations of mailboxes in the messaging system and is used in the delivery of a message. The message store service stores and retrieves incoming messages for reading and other manipulation by users associated with the server. The message transfer agent service consults the directory service to deliver messages in the messaging system.

The polling software 224 maintains two lists of server systems to query: a normal server system list and a critical server system list. The critical server system list includes all server systems that the polling software 224 has discovered as having deficiencies. The normal server system list includes all the other monitored server systems. Initially, all of the server systems monitored by the polling software 224 are included in the normal server system list since the server systems are assumed to have no deficiencies unless a deficiency is discovered. As described below, a server system entry may be transferred from the normal server system list to the critical server system list if a deficiency is discovered at the server system.

The server systems in the normal server system list are queried by the polling software 224 in accordance with a "normal" polling interval such as, for example, 15 minutes. The server systems in the critical server system list are queries at more frequent intervals of, for example, 2 minutes.

Figure 3:
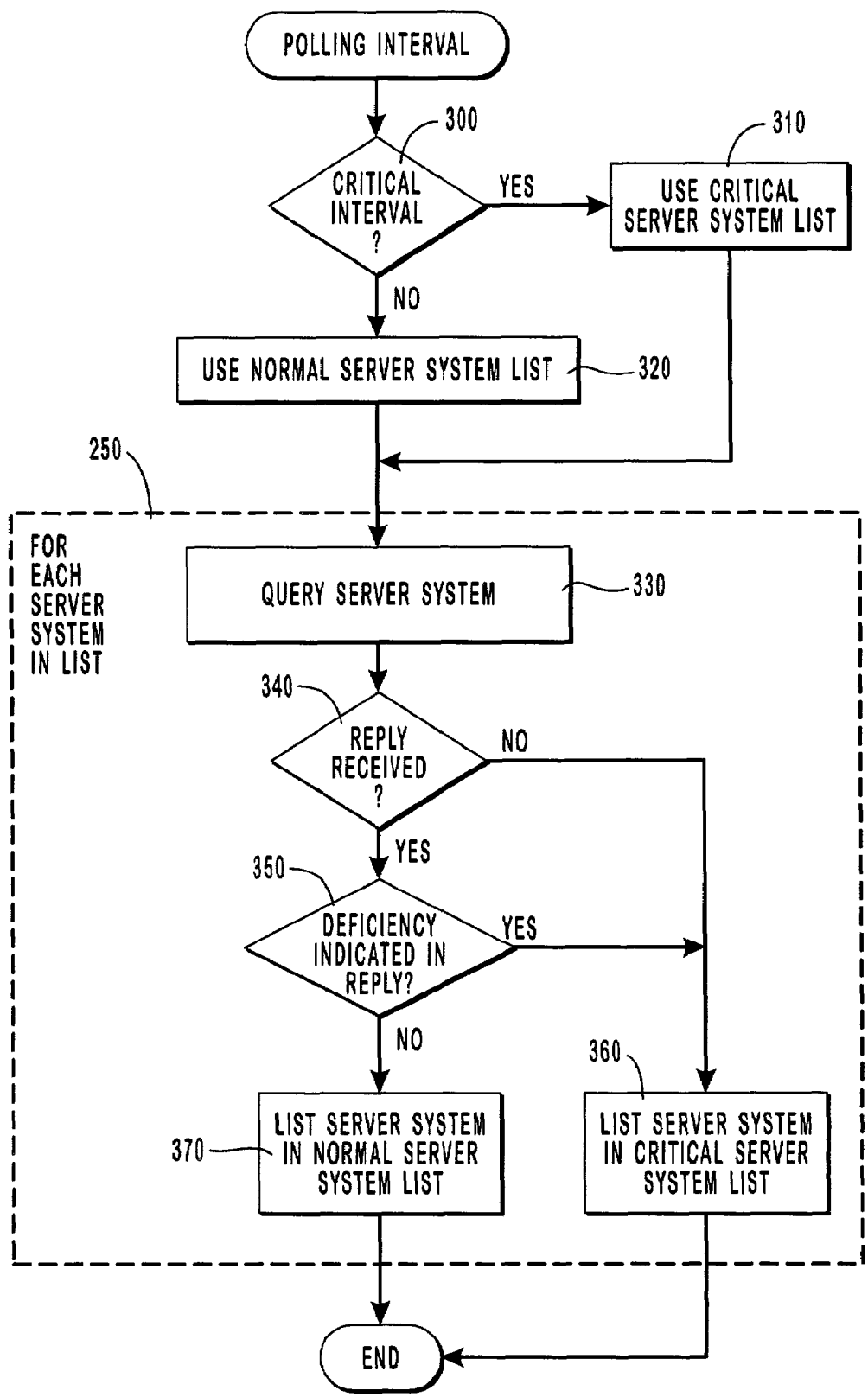
FIG. 3 is a flowchart of a method for polling monitored server systems for information.

FIG. 3 is a diagram of a polling procedure that is triggered in response to the commencement of one of the above-described polling intervals. The polling software 224 first determines the server systems to query by referring to the appropriate server systems list as is now described. If the procedure was triggered in accordance with the critical polling interval (Yes in decision block 300), the polling software 224 refers to the critical server system list (step 310). Otherwise (No in decision block 300), the polling software 224 refers to the normal server system list (step 320).

The polling software 224 then performs the following method for each server system in the resulting list. First, the polling software 224 queries the server system (step 330) by, for example, sending a network message to the attendant software 222 associated with the monitored server system. The attendant software 222 is expected to reply to the query with information in a compilation. The reply includes status indicators that indicate whether deficiencies exist in the time indicator 220 or services 226 of the server system. If the attendant software 222 for the server system does not reply with a compilation of information (No in decision block 340), the polling software 224 determines that the attendant software 222 is not operating properly, which constitutes a deficiency. The non-responsive server system is then listed in the critical server system list (step 360).

If the attendant software 222 or the monitored server system does reply with a compilation of information (Yes in decision block 340), the polling software 224 determines if there are any deficiencies in the server system as indicated in the reply (decision block 350). If a deficiency is found (Yes in decision block 350), the server system is listed in the critical server system list (step 360). On the other hand, if there are no deficiencies found (No in decision block 350), the server system is listed in the normal server system list (step 370). This process is repeated for all server systems in the list generated by steps 300, 310 and 320.

For example, in the context of a messaging system, an administrator may configure the polling software 224 to transfer the list entry for the server system to the critical server system list if the polling software 224 discovers that the site's directory service is in a non-functioning state (step 360). Such a transfer is appropriate, because the monitored server system is unable to operate properly without a functioning directory service. Transferring the list entry for the deficient server system to the critical server system list allows the polling software 224 to provide an administrator with information about the deficient server system more frequently.

The administrator is also able to pre-select configuration settings for the polling software 224 for queries involving the critical server system list. For example, according to a list-transfer setting, a list entry for a server system may be transferred back to the normal server system list (step 370). Such a transfer may occur if all deficiencies reflected in earlier replies from the server system's attendant software are absent from the most recent reply from that attendant software. In most cases, such a setting is appropriate, because, after all of a server system's deficiencies have cleared, the administrator typically desires information at less frequent intervals. A deficiency may clear in response to one or more actions taken by the administrator or by an automated mechanism or both.

At the monitored server system 212', the attendant software 222 preferably may gather some information autonomously and other information only after receiving a query from the polling software 224. However, all of the information provided in response to the query, regardless of the way in which some of the information is gathered, is provided to the polling software 224 in one compilation and is not provided piecemeal. For example, the attendant software 222 autonomously monitors a particular capability of the server messaging software 218. The capability involves allowing the reading of mail and making a working connection with a new instance of client messaging software 216, as described above. The attendant software 222 so monitors by simulating the executions of a mail-reading procedure and a login procedure. The simulation is accomplished by exercising the server messaging software 218 in the same way that the server messaging software 218 is exercised in the executions of actual mail-reading and login procedures.

Figure 4:
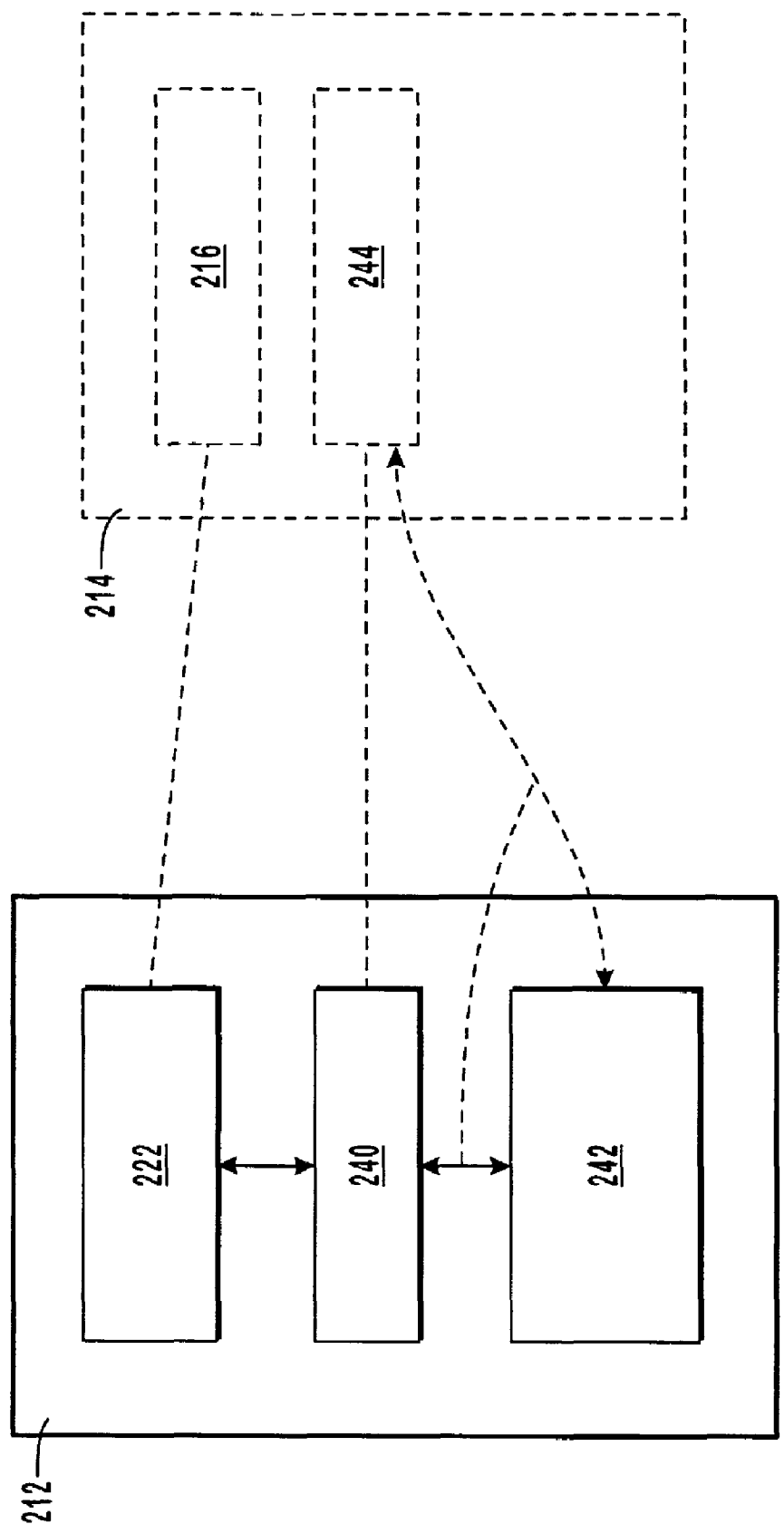
FIG. 4 is a block diagram of a client-server system in the network environment of FIG. 2.

FIG. 4 illustrates the operation of the server messaging software 218. The system attendant software 222 has a messaging account, i.e., the attendant account, that is created when the attendant software 222 is first located and started at the server system 212. The use of the attendant account differs from the use of the messaging account of an ordinary user of the server system 212 in that the attendant software 222 does not send a password to gain access to the attendant account. Instead, the attendant software 222 gains access by submitting security codes retrieved from a network source that is responsible for network security. In other regards, the attendant account is preferable identical, aside from its contents and the like, to an ordinary user's account.

At the time the attendant account is created, a message store buffer service 240 is also located and started at the server system 212. Through the buffer service 240, the attendant software 240 gains access to the server software's message store service 242. The buffer service 240 is preferably identical to a user buffer service 244 that, in the case of an actual user, runs on the user's client system 214 along with the user messaging software 216. With respect to an actual user, the user buffer service 244 minimizes the user software's use of the link between the user software and server software by buffering information from the message store service 242. For example, when the message store service 242 receives a new message directed to the user running the client messaging software 216, the message store service 242 sends a new-mail indication to the user buffer service 240. Thus, when the client messaging software 216 is ready to determine whether the user has one or more new messages, the user software is able to make the determination by referring to the user buffer service 240, not to the message store service 242 directly.

Figure 5:
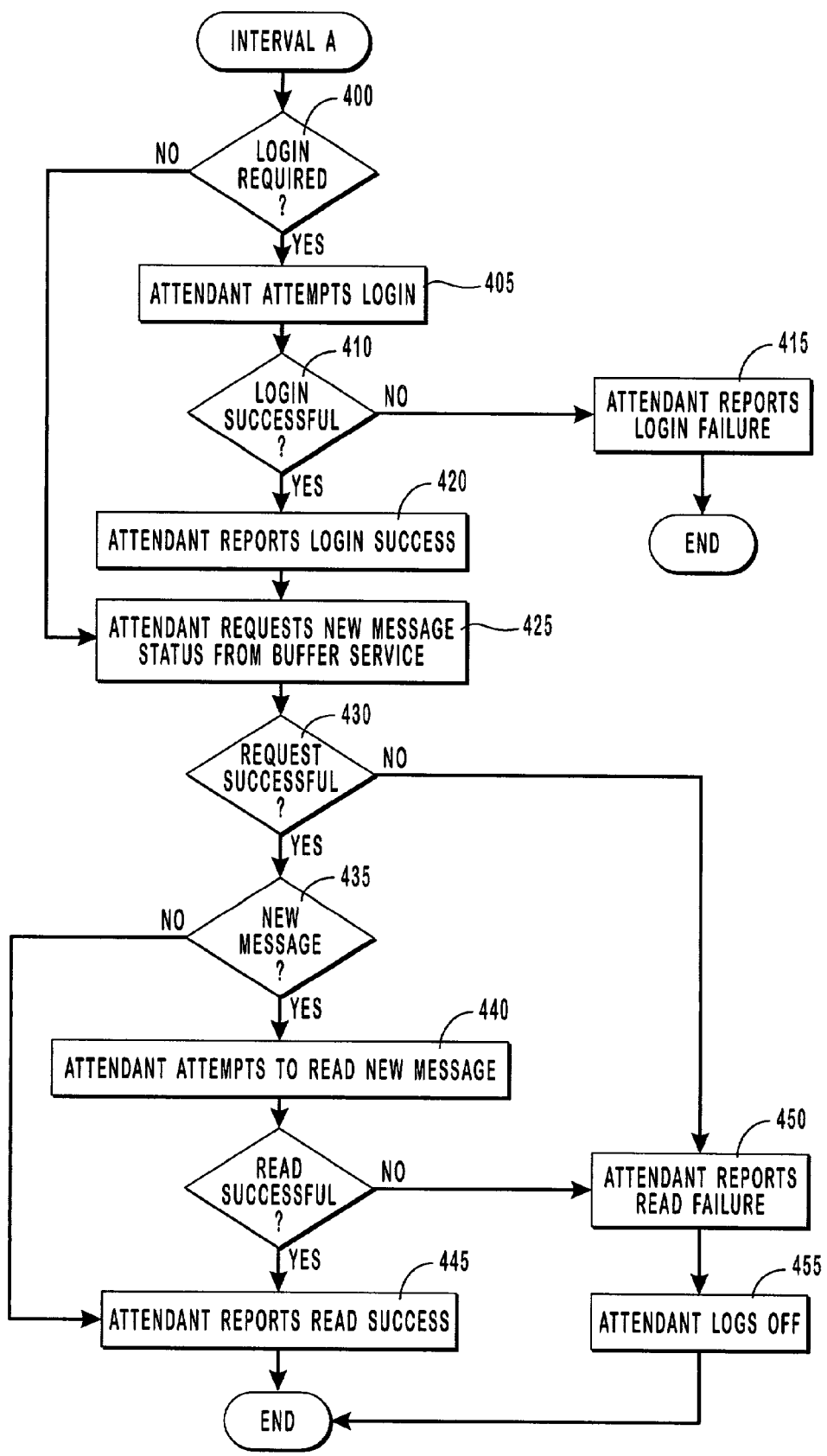
FIG. 5 is a flowchart of a method for the login and mail-reading capabilities of the monitored server system.

The attendant software 222 tests the use of the buffer service 240 by executing, at periodic intervals "A" of preferably one minute each, an interval A function as shown in FIG. 5. First, the attendant software 222 determines whether it is necessary for the attendant software 222 to execute a login procedure to establish a working connection with the server software (decision block 400). If so, a login procedure is attempted (step 405). In the login procedure, the server software restarts services and establishes a working connection with the attendant software 222. If the login procedure fails (410), the attendant software 222 reports a login failure (step 415) for the next compilation reply, as described below, and terminates the execution of the interval A function. On the other hand, if the login procedure is successful, the attendant software 222 reports a login success (step 420) and the execution of the interval A function continues.

A working connection having been established during this or a previous instance of executing an interval A function, the attendant software 222 then requests that the buffer service 240 indicate whether any new messages have arrived for the attendant software 222 (step 425). If the buffer service 240 responds properly to the request (Yes in decision block 430), the attendant software 222 then determines whether the response of the buffer service 240 indicates that the attendant software 222 has a new message (step 435). If the response so indicates (Yes in decision block 435), the attendant software 222 then attempts to read the new message (step 440). A successful read attempt or a lack of a new message to read causes the attendant software 222 to finish the interval A function with a successful report (step 445).

However, if the attendant software 222 does not receive a proper response from the buffer service 240 or if the read attempt is unsuccessful, the attendant software 222 reports failure (step 450) and then executes a logoff procedure (step 455). In the logoff procedure, the attendant software 222 terminates the working connection with the server software. The logoff procedure is executed to set up the attendant software 222 to attempt to execute a login procedure at the start of the next execution of an interval A function. The logoff-login sequence is used to (1) attempt to address the cause of the failure, by causing, as described above, services to restart in the login procedure, and (2) test the ability of the server software to accept the execution of a login procedure.

In the case of an actual user and user computer, the buffer service 240 rarely requests information from the message store service 242. Rather, the buffer service 240 simply waits for the message store service 242 to provide information. However, the buffer service 240 includes a facility that is triggered when the buffer service 240 has not received information from the message store service for a long time, e.g., one hour, while a working connection exists. The facility is triggered to confirm that the lack of received information is not due to a problem in communications between the buffer service 240 and the message store service 242. The facility updates the buffer service's buffer of information by causing the buffer service to renew the buffer service's connection with the message store service and to request information from the message store service.

Figure 6:
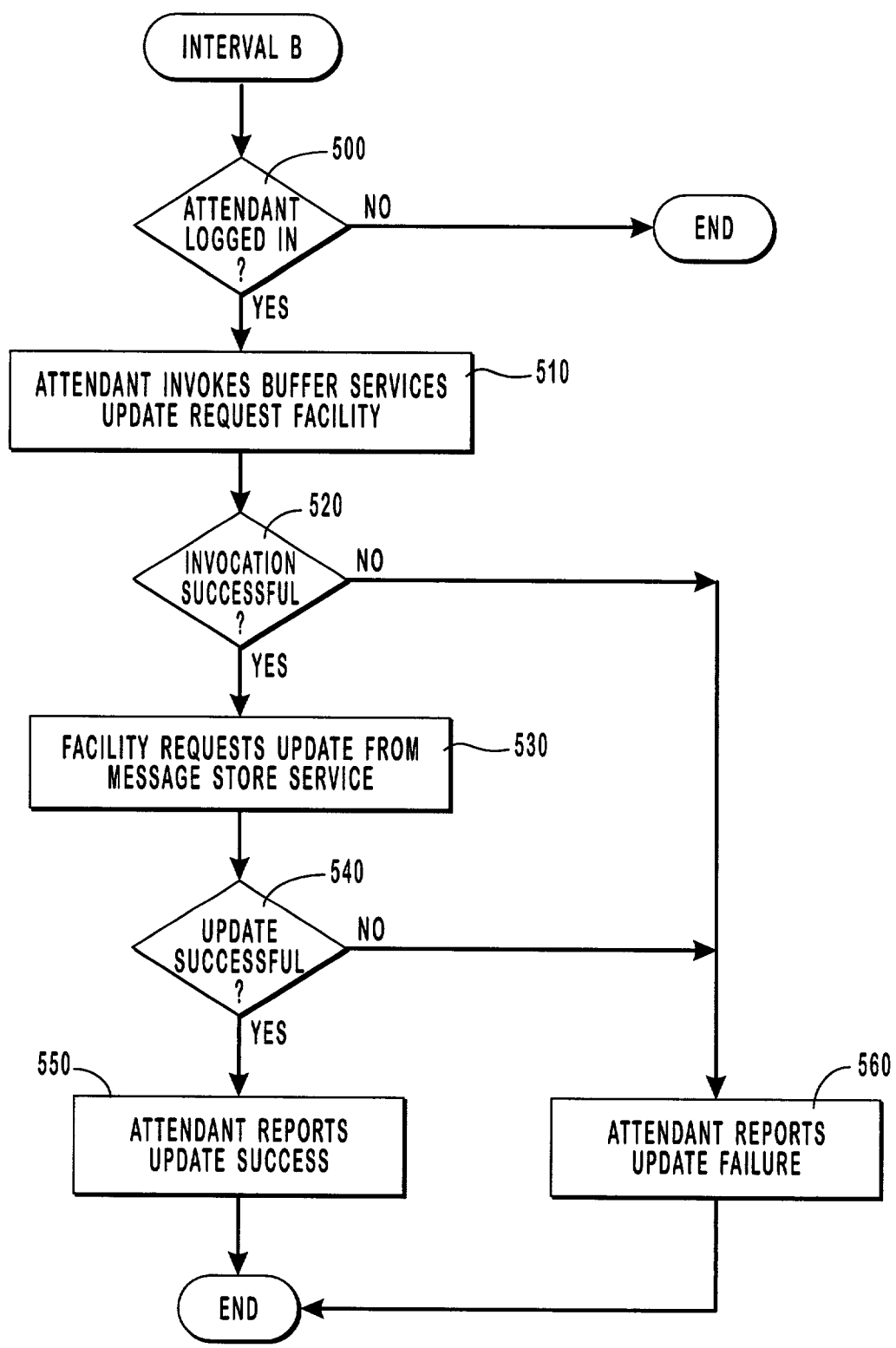
FIG. 6 is a flowchart of a method for testing the buffer-service-updating capability of the monitored server system.

The attendant software 222 uses the facility at intervals "B", preferably every five minutes. The use of the facility at every five minutes allows the attendant software 222 to detect a communications problem quickly, i.e., within much less than the facility's standard one-hour interval. In the interval B function of FIG. 6, the attendant software 222 is able to use the facility only if the attendant software 222 has a working connection to the server software, i.e., if the attendant software 222 is "logged in" (Yes in decision block 500). The attendant software 222 invokes the facility (step 510) and then determines whether the invocation was successful (step 520). The invocation is expected to be successful unless the buffer service 240 has developed a problem.

If successfully invoked, the facility then requests an update, as described above, from the message store service 242 (step 530). If the update proceeds successfully (Yes in decision block 540), the success is reported for the next compilation reply (step 550). However, if either the invocation or the update request is unsuccessful, the attendant software 222 reports failure for the interval B function (step 560).

Figure 7:
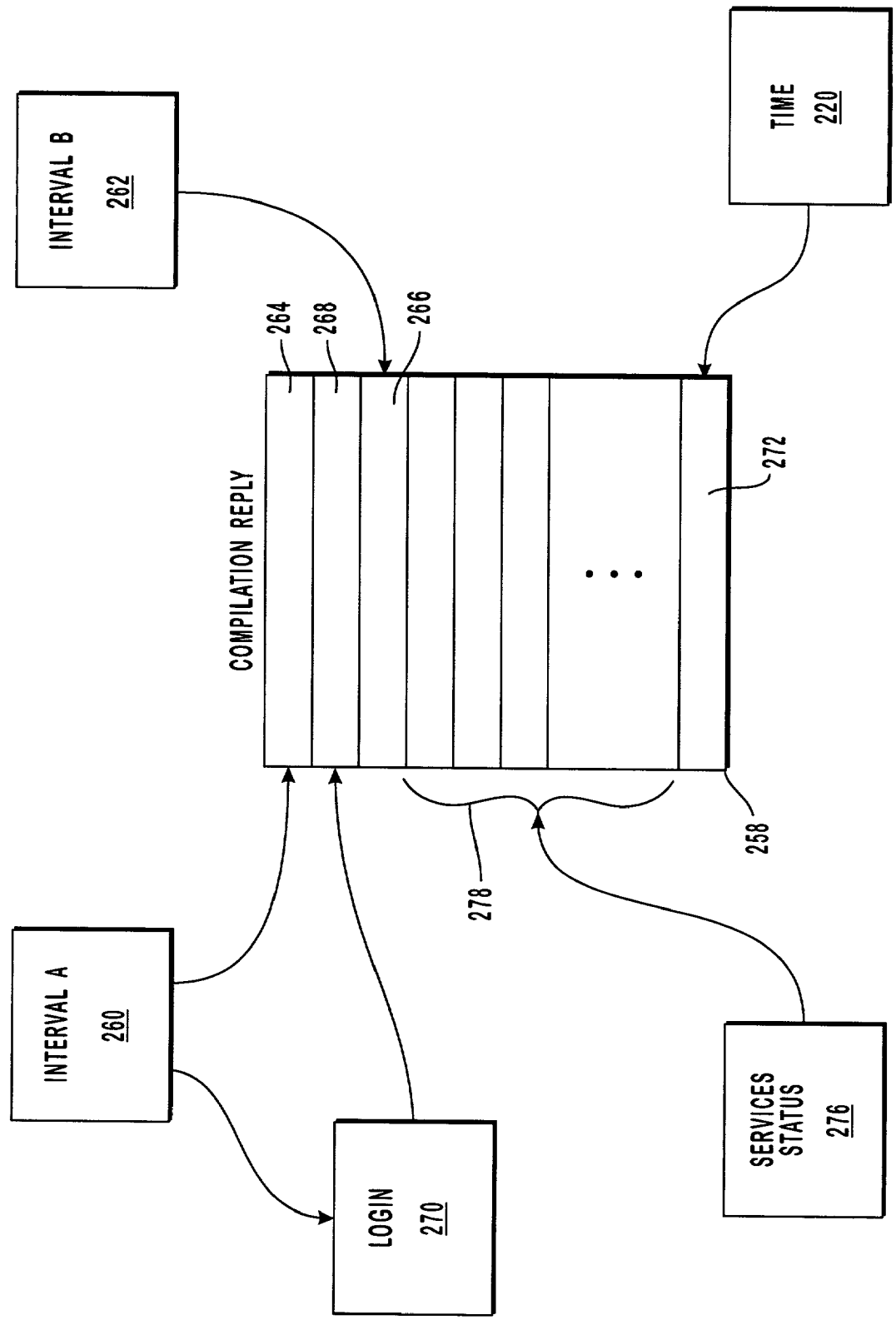
FIG. 7 is a block diagram of the structure of a compilation reply.

The reports of the interval A and interval B function are included in the compilation reply that is sent to the polling software 224 after the attendant software 222 receives a query from the polling software 224. FIG. 7 illustrates the construction of the compilation reply 258. The interval A and interval B functions 260, 262 contribute reports 264, 266 about the last attempt of the attendant software 222 to read mail and update the buffer service 240. In addition, a report 268 about the attendant software's login-related capability is included from the login test 270 that is driven via the interval A function 260. The compilation reply 258 also includes a time value 272 from the server's time indicator 220. The compilation reply 258 further includes, from a service-status function 276 of the attendant software 222, a set 278 of reports that includes the status of each of various services running on the server.

Figure 8:
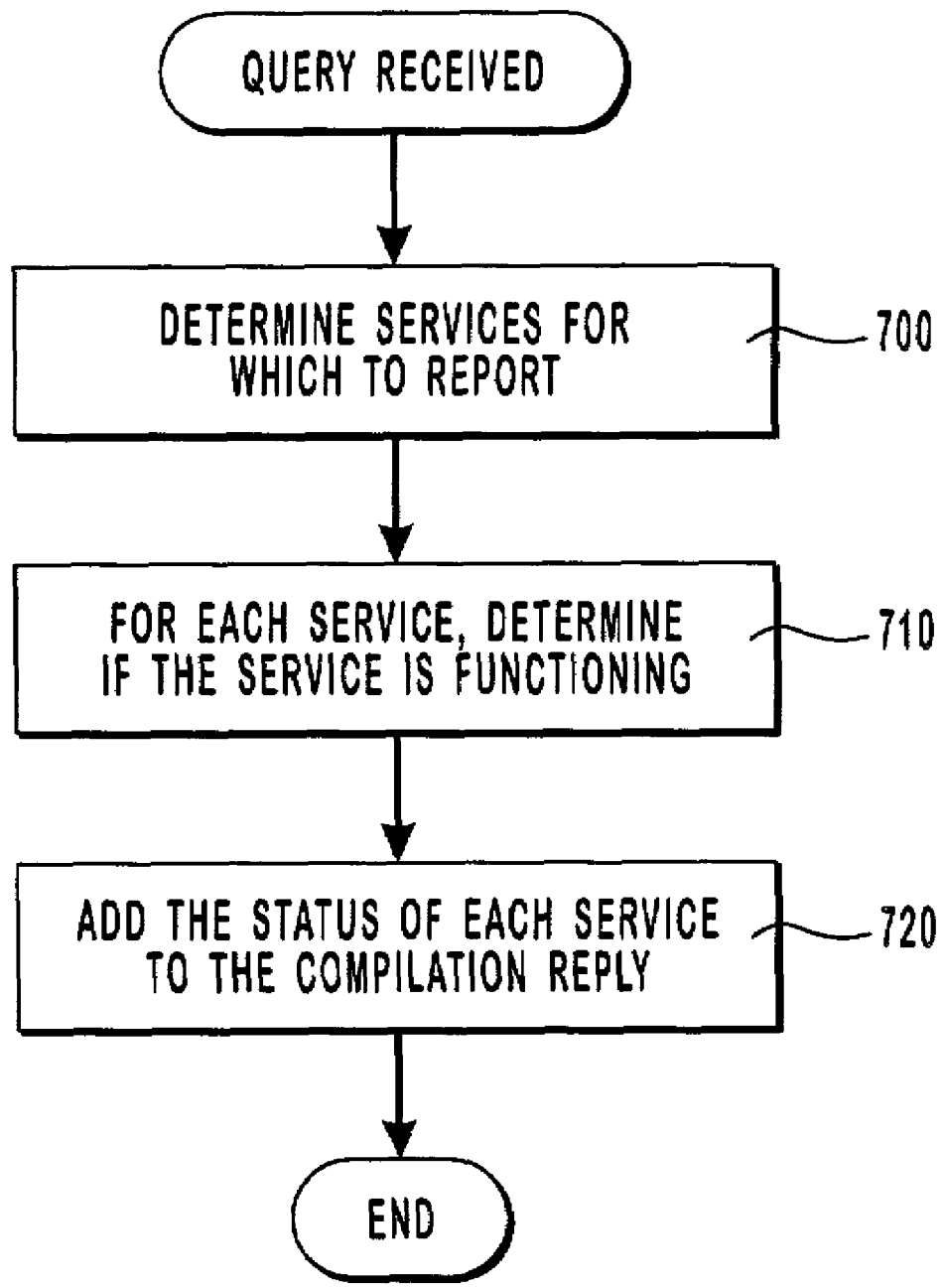
FIG. 8 is a flowchart of a procedure for including the status of a software service in the compilation reply of FIG. 7.

To include each status in the reply 258, the attendant software 222 first determines the services for which a status should be reported as shown in FIG. 8 (step 700). The attendant software 222 so determines by referring to a services list that includes services that were pre-selected by the administrator for the particular server. The server's services list preferably includes server messaging software services such as, as noted above, the directory service, the message store service, and the MTA service. Depending on the services available on a particular server, the administrator can configure the server's services list to include other services as well. Examples of these other services are (1) a service that is involved with communicating messages and computer data across the Internet and (2) a facsimile communications service.

The attendant software 222 then determines, for each service in the service list, whether the service is functioning properly (step 710). To do so, the attendant software 222 preferably invokes a facility of the operating system that reports whether the service is functioning properly. The report of the facility serves as the basis of the status determined for the service.

Figure 9:
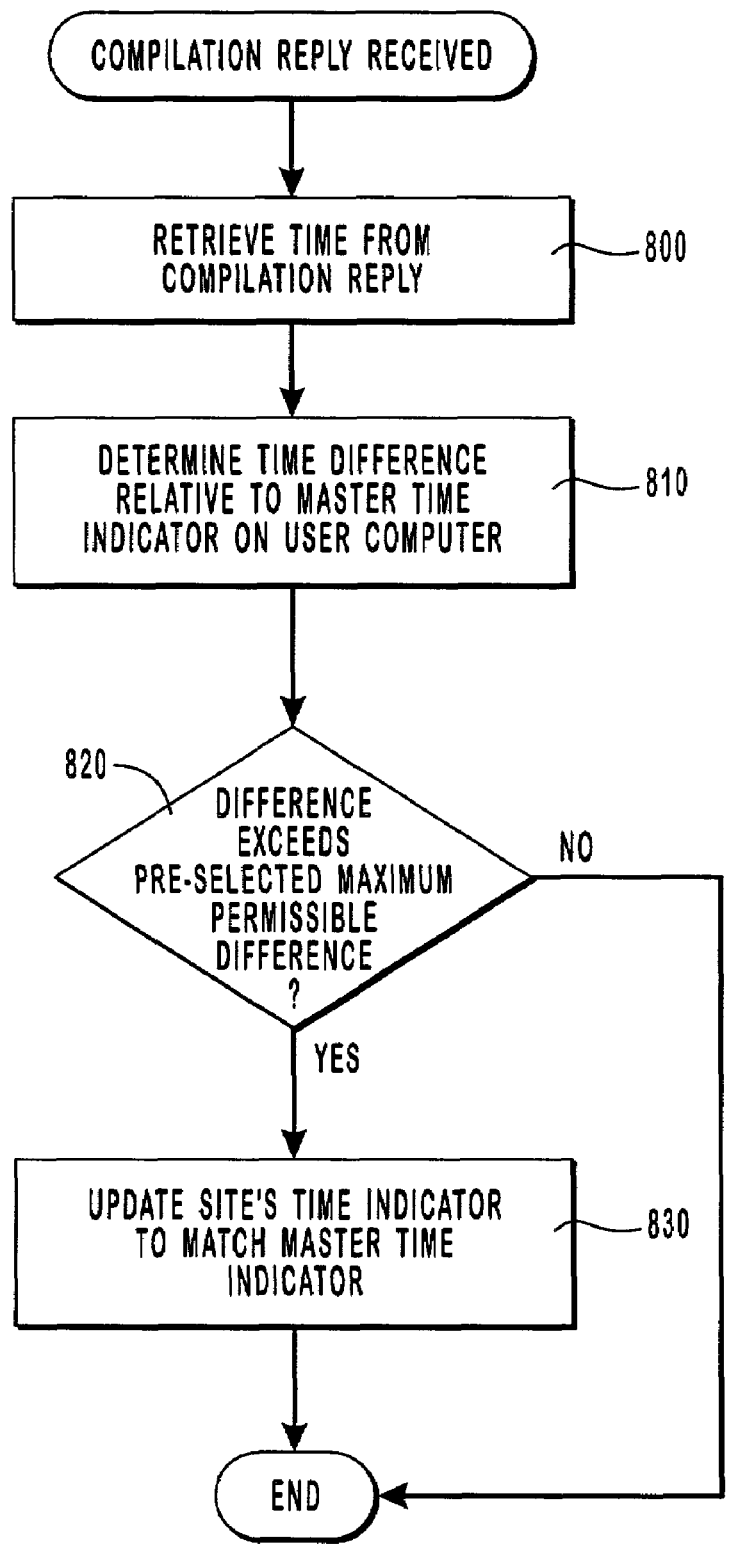
FIG. 9 is a flowchart of a procedure for synchronizing a monitored server system time indicator with a master time indicator.

Finally, for each service in the services list, the attendant software 222 adds the status of the service to the reply 258 (step 720). When the polling software 224 receives a compilation reply 258 from a server, the polling software 224 updates the server's clock 120 if necessary as shown in FIG. 9. To do so, the polling software 224 first retrieves the server's time from the reply 258 (step 800). The time includes a time zone indicator. The server's time is adjusted with respect to time zone and then compared to a master time kept by a master time indicator at the polling software's user computer (step 810). The difference in the times is then compared to a maximum permissible difference that is pre-selected by the administrator (step 820). If the maximum permissible difference is exceeded, the polling software 224 then causes the server's time indicator 220 to be updated to match the user's computer's master time indicator (step 830). By updating each server's clock as just described, the polling software 224 is able to synchronize the clocks of all of the messaging system's servers 212 that share the polling software 224.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What invention claimed is:

1. At a server system that is to poll, a method of enhancing performance monitoring for a server system by reducing polling time through the reduction in the number of queries generated to monitor the performance of a plurality of various services provided by the monitored server system, the method comprising:

the step of generating a single query requesting a compilation of information about the performance of a plurality of different services offered by a monitored server system;

the step of transmitting the single query from the polling server system to the monitored server system;

the step of receiving one reply that includes the compilation of information about the performance of the plurality of the different services offered by the monitored server system, without receiving the information about the performance of the plurality of the different services in a piecemeal fashion, wherein the compilation includes:

a first set of information about one or more of the plurality of different services offered by the monitored server system and gathered by the monitored server system in response to its receipt of the single query transmitted from the polling server system; and a second set of information about one or more of the plurality of different services, which second set of information was gathered by the monitored server system autonomously and using at least one interval established in the monitored server system as opposed to the polling server system;

the step of using the compilation to update at least a first and a second server system lists with information on the monitored server system, wherein server systems included within the first server system list are polled more frequently than server systems included within the second server system list.

2. The method of claim 1, further comprising:

the step of, at the polling server system, receiving from a client system a request for at least some of the information contained in the compilation; and the step of transmitting the at least some of the information contained in the compilation from the polling server system to the client system in response to the request.

3. The method of claim 1, further comprising:

the step of automatically transmitting at least some of the information contained in the compilation from the polling server system to a client system.

4. The method of claim 1, wherein the compilation comprises a status of network services of the monitored server system.

5. The method of claim 4, wherein the network services comprise a directory service.

6. The method of claim 4, wherein the network services comprise a message store service.

7. The method of claim 4, wherein the network services comprise a message transfer agent.

8. The method of claim 4, wherein the network services comprise a facsimile communications service.

9. The method of claim 4, wherein the network services comprise an Internet communications service.

10. The method of claim 4, wherein the network services comprise a messaging service.

11. The method of claim 10, further comprising:

the step of, at the monitored server system, automatically attempting to establish a working connection to a mailbox in the messaging service;

the step of, at the monitored server system, determining whether the working connection is established; and the step of reporting the result of the step of determining in the compilation.

12. The method of claim 11, further comprising:

the step of, depending on the result of the step of determining, automatically attempting to determine whether a message is available at the mailbox; and the step of, depending on the result of the step of determining whether the working connection is established, automatically reporting in the compilation the result of the step of determining whether a message is available at the mailbox.

13. The method of claim 12, further comprising:

the step of, depending on the result of the step of automatically attempting to determine whether a message is available at the mailbox, attempting to read the message; and the step of, depending on the result of the step of automatically attempting to determine whether a message is available at the mailbox, reporting in the compilation the result of the step of attempting to read the message.

14. The method of claim 11, wherein the result of the step of automatically attempting to establish a working connection depends on the messaging services' acceptance of a security code.

15. The method of claim 11, wherein the step of automatically attempting to establish a working connection is driven by a detection of a failure in the messaging service.

16. The method of claim 11, wherein the method further comprises the step of exercising a software service used in the establishment of a user's working connection.

17. The method of claim 16, wherein the software service comprises a buffer service.

18. The method of claim 1, further comprising:

the step of, at the polling server system, installing polling software capable of performing the step of transmitting the single query from the polling server system to the monitored server system; and the step of, at the monitored server system, installing attendant software capable of generating the compilation of information about the performance of the plurality of services offered by the monitored server system.

19. The method of claim 18, further comprising:

the step of the attendant software monitoring a time indicator at the monitored server system; and the step of the attendant software including a time indication based at the monitored server system with the compilation.

20. The method as defined in claim 19, further comprising:

the step of the polling software monitoring a master time indicator at the polling server system to determine a master time indication; and the step of comparing the time indication in the compilation with the master time indication of the polling server system.

21. The method of claim 20, further comprising:

the step of, if the difference between the time indication in the compilation and the master time indication exceeds a maximum permissible difference, the polling software at the polling server system causing the time indicator at the monitored server system to be updated to more accurately match the master time indication at the polling server system.

22. The method of claim 1, further comprising the step of, at the monitored server system, generating the compilation of information about the performance of the plurality of services offered by the monitored server system.

23. The method of claim 1, wherein the step of using the compilation to update at least one server system list comprises:

the step of listing the monitored server system in a normal server system list if the compilation does not indicate any deficiencies in the monitored server system; and the step of listing the monitored server system in a critical server system list if the compilation indicates deficiencies in the monitored server system, wherein the first server systems list is the critical server system list and the second server system list is the normal server system list.

24. The method of claim 23, wherein the compilation is a current compilation, wherein the step of using the compilation to update at least one server system list comprises the step of transferring the monitored server system from the normal server system list to the critical server system list if a previous compilation indicated no deficiencies in the monitored server system, but a current compilation indicates a deficiency in the monitored server system.

25. The method of claim 24, wherein the step of transferring the monitored server system from the normal server system list to the critical server system list is caused by a polling software settings set in the polling server system by a system administrator.

26. The method of claim 23, wherein the compilation is a current compilation, wherein the step of using the compilation to update at least one server system lists comprises the step of transferring the monitored server system from the critical server system list to the normal server system list if a previous compilation indicated deficiencies in the monitored server system, but the current compilation indicates no deficiencies in the monitored server system.

27. The method of claim 26, wherein the step of transferring the monitored server system from a critical server system list to a normal server system list is caused by a setting of polling software set in the polling server system by a system administrator.

28. At a server system that is to be monitored, a method of enhancing performance monitoring for a server system by reducing polling time through the reduction in the number of queries generated to monitor the performance of a plurality of various services provided by the monitored server system, the method comprising:

the step of receiving a single query from a server system that is to poll, wherein the single query requests a compilation of information about the performance of a plurality of different services offered by the monitored server system;

the step of determining the plurality of different services that information about the performance thereof is requested;

the step of the monitored server system generating one reply that includes the compilation of information about the performance of the plurality of the different services offered by the monitored server system, wherein the compilation indicates that at least a first of the plurality of different services has one or more performance deficiencies, and wherein the step of generating one reply that includes the compilation of information includes:

in response to receiving the single query and determining the plurality of different services, gathering a first set of data about the plurality of different services and adding the first set of data to the reply; and adding a second set of data to the reply, the second set of data including information about the plurality of different services, the second set of data being gathered by the monitored server system autonomously and independent of receipt of the single query;

the step of transmitting the compilation from the monitored server system to the polling server system, without transmitting the information about the performance of the plurality of the different services in a piecemeal fashion; and based on the indication that the at least one of the plurality of different services has one or more performance deficiencies, the step of receiving with increased frequency polling requests for information about the performance deficiencies for the at least one of the plurality of different services.

29. The method of claim 28, wherein the different services that are determined are based on a pre-selected group of different services set by an administrator for the monitored server system.

30. At a server system that is to poll, one or more storage-type computer-readable media for implementing a method of enhancing performance monitoring for a server system by reducing polling time through the reduction in the number of queries generated to monitor the performance of a plurality of various services provided by the monitored server system, the one or more storage-type computer-readable media having stored thereon computer-executable instructions for performing the following:

the step of generating a single query requesting a compilation of information about the performance of a plurality of different services offered by a server system that is to be monitored;

the step of transmitting the single query from the polling server system to the monitored server system;

the step of, at the polling server system, receiving one reply that includes the compilation of information about the performance of the plurality of the different services offered by the monitored server system, without receiving the information about the performance of the plurality of the different service in a piecemeal fashion, wherein the compilation includes:

a first set of information about one or more of the plurality of different services offered by the monitored server system and gathered by the monitored server system in response to its receipt of the single query transmitted from the polling server system; and a second set of information about one or more of the plurality, of different services, which second set of information was gathered by the monitored server system autonomously and using at least one interval established in the monitored server system as opposed to the polling server system; and the step of using the compilation of information to update at least a first and a second server system lists with information on the monitored server system, wherein server systems included within the first server system list are polled more frequently than server systems included within the second server system list.

31. At a computer system that is to be monitored, one or more storage-type computer-readable media for implementing a method of enhancing performance monitoring for a server system by reducing polling time through the reduction in the number of queries generated to monitor the performance of a plurality of various services provided by the monitored server system, the one or more storage-type computer-readable media having stored thereon computer-executable instructions for performing the following:

the step of receiving a single query from a server system that is to poll, wherein the single query requests a compilation of information about the performance of a plurality of different services offered by the monitored server system;

the step of determining the plurality of different services that information about the performance thereof is requested;

the step of the monitored server system generating on reply that includes the compilation of information about the performance of the plurality of the different services offered by the monitored server system wherein the compilation indicates that at least a first of the plurality of different services has one or more performance deficiencies, and wherein the step of generating one reply that includes the compilation of information includes:

in response to receiving the single query and determining the plurality of different services, gathering a first set of data about the plurality of different services and adding the first set of data to the reply; and adding a second set of data to the reply, the second set of data including information about the plurality of different services, the second set of data being gathered by the monitored server system autonomously and independent of receipt of the single query;

the step of transmitting the compilation from the monitored server system to the polling server system, without transmitting the information about the performance of the plurality of the different services in a piecemeal fashion; and based on the indication that the at least one of the plurality of different services has one or more performance deficiencies, the step of receiving with increased frequency polling requests for information about the performance deficiencies for the at least one of the plurality of different services.

32. The computer-readable medium of claim 31, wherein the computer-executable instructions for performing the step of generating the compilation of information are for performing the following:

the step of automatically attempting to establish a working connection to a mailbox in a messaging system of the monitored server system;

the step of determining whether the working connection is established; and the step of including the result of the attempt in the compilation, wherein the one or more performance deficiencies is directed toward the working connection to the mailbox.

33. The computer-readable medium of claim 32, wherein the computer-executable instructions for performing the step of generating the compilation of information are further for performing the following:

the step of, depending on the result of the step of determining whether the working connection is established, automatically attempting to determine whether a message is available at the mailbox; and the step of, depending on the result of the step of determining whether the working connection is established, including the result of the step of automatically attempting to determine whether a message is available at the mailbox in the compilation.

34. The computer-readable medium of claim 33, wherein the computer-executable instructions for performing the step of generating the compilation of information are further for performing the following:

the step of, depending on the result of the step of automatically attempting to determine whether a message is available, attempting to read the message; and the step of, depending on the result of the step of automatically attempting to determine whether a message is available, including the result of the step of attempting to read the message in the compilation.

35. At a server system that is to poll, a method of enhancing performance monitoring for a server system by reducing polling time through the reduction in the number of queries generated to monitor the performance of a plurality of various services provided by the monitored server system, the method comprising:

the act of generating a single query requesting a compilation of information about the performance of a plurality of different messaging services offered by a monitored server system, wherein the plurality of different messaging services offered by the monitored server system include a directory service, a message store service, and a message transfer agent service, wherein the single query is generated using polling software installed on the polling server system, and wherein the polling server system is connected to the monitored server system over a network;

the act of transmitting the single query from the polling server system to the monitored server system over the network;

the act of receiving one reply that includes the compilation of information about the performance of the plurality of the different messaging services offered by the monitored server system, including about at least the directory service, message store service, and message transfer agent service, without receiving the information about the performance of the plurality of the different messaging services in a piecemeal fashion, wherein the compilation includes:

a first set of information about one or more of the plurality of difference messaging services, which first set of information was gathered by the monitored server system in response to its receipt of the single query; and a second set of information about one or more of the plurality of different messaging services, which second set of information was gathered by the monitored server system autonomously, and which includes:

information about a buffer service associated with the message store service, which information was gathered autonomously by the monitored server system at a first interval; and information about a facility for updating the buffer service, wherein the facility tests communications between the buffer service and the message store service, and wherein the information about the facility was gathered autonomously by the monitored server system at a second interval greater than the first interval;

the act of determining that the compilation indicates a deficiency in at least one deficient service of the plurality of the different messaging services; and using the compilation to update a critical server system list with information on the monitored server system, such that the monitored server system is polled by the polling server system more frequently than other servers associated with normal server systems when the compilation indicates a deficiency in even a single of the plurality of different messaging services.

* * * * *